United States Patent [19]

Lijphart et al.

[11] Patent Number: 4,584,534
[45] Date of Patent: Apr. 22, 1986

[54] METHOD AND APPARATUS FOR DEMODULATING A CARRIER WAVE WHICH IS PHASE MODULATED BY A SUBCARRIER WAVE WHICH IS PHASE SHIFT MODULATED BY BASEBAND SIGNALS

[75] Inventors: Enno E. Lijphart, Bensheim; Gerardus Drewes, Heppenheim, both of Fed. Rep. of Germany

[73] Assignee: Agence Spatiale Europeenne, Paris, France

[21] Appl. No.: 529,632

[22] Filed: Sep. 6, 1983

[30] Foreign Application Priority Data

Sep. 9, 1982 [FR] France .................................. 82 15297

[51] Int. Cl.⁴ .............................................. H03D 3/00
[52] U.S. Cl. .................................... 329/122; 329/110; 375/83
[58] Field of Search ............... 329/110, 112, 120, 122; 375/53, 56, 83, 84; 455/205, 208

[56] References Cited

U.S. PATENT DOCUMENTS 3,993,956 11/1976 Gilmore et al. ................ 329/120 X
4,224,575 9/1980 Mosley et al. .................. 329/122 X
4,509,017 4/1985 Andren et al. .................. 329/110 X Primary Examiner—Eugene R. LaRoche
Assistant Examiner—Robert J. Pascal
Attorney, Agent, or Firm—Fidelman, Wolffe & Waldron

[57] ABSTRACT

The invention relates to a method for demodulating a carrier wave which is phase modulated by a subcarrier wave which is phase shift modulated by baseband signals and applies especially to data transmission between a spacecraft and a ground station. The technological problem addressed is reduction of signal degradation and, consequently, of transmission power and size of the receiving antenna. According to the invention, the frequency is first down converted to an intermediate frequency ($f_c$) which is lower than the carrier wave frequency; the subcarrier wave is extracted by phase demodulation using a Costas loop; digital sampling is performed on the signal demodulated in a Costas loop at a frequency which is twice the intermediate frequency ($f_c$) and the bit clock frequency ($f_B$) is regenerated in a first order phase locked loop using the subcarrier wave frequency as a reference frequency.

16 Claims, 4 Drawing Figures

METHOD AND APPARATUS FOR DEMODULATING A CARRIER WAVE WHICH IS PHASE MODULATED BY A SUBCARRIER WAVE WHICH IS PHASE SHIFT MODULATED BY BASEBAND SIGNALS

BACKGROUND AND SUMMARY OF THE INVENTION

This invention relates to transmission of digital signals by carrier waves, for example between a spacecraft and a ground station.

Whenever data are transmitted from a spacecraft to a ground station, the information to be transmitted consists of binary data resulting from sampling onboard the spacecraft and binary encoding. The resuling code, which is inappropriately called pulse code modulation (PCM) may be further encoded for purposes of error detection and correction, for instance by convolutional coding or Reed-Solomon coding. The resulting codes are converted into binary code or "non return to zero" (NRZ) format, or into split phase level (SP-L) format, which, advantageously, is a self-clocking code. The resulting baseband signals are used to perform a phase-modulation process of a carrier wave (PSK=phase shift keying). In this modulation process, a code transition translates into a phase inversion of the carrier or of the subcarrier wave. In the case of subcarrier modulation, the subcarrier frequency is coherent with the bit rate. Where the subcarrier has a positive zero crossing at the start of each bit, as prescribed by certain modulation standards, this feature may be used for resolution of the PSK-phase ambiguity.

A second modulation process takes place with relation to the PSK wave and which, according to normal practice, is a conventional phase modulation process. Whenever the first phase modulation process by baseband signals was performed on the carrier, this second modulation process is omitted, and the resulting modulation is known as binary phase shift keying (BPSK). Finally, the modulated radio frequency carrier wave may be up-converted and is transmitted to earth.

FIG. 1 is a functional block diagram of a conventional receiver of phase-modulated waves comprising a subcarrier. Basically, the inverse processes of modulation take place. A demodulator (1) phase-demodulates the received signals to produce the subcarrier modulated by the baseband. To warrant phase-coherent reception by the carrier, the demodulator (1) should be capable of determining or estimating the phase and frequency of the received signal with as little error as possible. This can be achieved by using a reference signal which is derived from the received wave's remanent carrier frequency component. This component can be tracked with a carrier-tracking loop (2). The subcarrier modulated by the baseband is passed on to a second demodulator (3) which then performs phase-demodulation to produce the baseband signal. Similar to the processing in the first demodulator, this demodulator (3) comprises a means of subcarrier tracking. Since PSK modulation does not leave a usable subcarrier component, the subcarrier tracking loop (4) must be a squaring loop or a Costas loop.

In the case of BPSK modulation, the carrier tracking loop 2 must be based on the same squaring or Costas principle, or an incoherent reception system may be used. In this case, subcarrier demodulation is omitted.

The baseband signals are subsequently passed onto a bit conditioner (5) which regenerates the bit clock signal and thus produces the bit stream and information on the confidence level if error correction and detection coding is used at the output. If a convolutional decoder is subsequently used, this is called "soft decision" and is coded in two bits. Finally, a decoder (6) reconstitutes the initial binary data by performing an appropriate decoding process, such as convolutional decoding followed by Reed-Solomon decoding.

FIG. 2 is a diagram of a phase demodulator which uses a Costas loop. The wave to be demodulated is passed on to two arms: a "data" arm and an "error" arm, each of which comprises a mixer or multiplier (7 and 8, respectively) and a matched filter (9 and 11, respectively). The signals provided by these two arms are multiplied in a multiplier (12), the output signal of which is filtered in a second order loop filter (13), wherein the filtered signal forms the frequency control signal of a variable oscillator (14) which supplies a reference frequency to the two multipliers (7 and 8), wherein the reference frequency supplied to multiplier 8 has a phase shift of 90° for the "error" arm. In the case of the subcarrier tracking loop (4) of FIG. 1, for example, the two "data" and "error" arms generate baseband frequency signals and the central arm formed of elements 13 and 14 restitutes signals at the subcarrier wave frequency.

A demodulator apparatus as illustrated in FIG. 1 will exhibit degradation of information with respect to its theoretical characteristics: for a given probability of errors, a higher ratio of power to noise is required, where power is the signal power received and noise is the spectral density of the (white or Gaussian) noise received. In addition, this apparatus will exhibit threshold effects in the phase locked loops, which will cause the degradation to be higher nearer the threshold.

The need to reduce the degradation and lower the thresholds is enhanced when error detection and correction coding is used, since the very purpose of such coding is to reduce the energy per bit required on reception, that is, to reduce the transmit power or antenna size. In addition, the use of these codes entails an increase in channel width, that is, an increase of the bit rate. This results in a reduction of energy per bit to be demodulated. Finally, certain error detection and correction decoders, especially convolutional decoders, are designed on the assumption that the errors in the demodulated code occur randomly, that is, they follow Poissons distribution. However, the increased probability of errors which is the consequence of degradation is not time independent but presents itself in bursts of errors. The benefits of error detection and correction coding can be severely reduced by this effect.

Reasons for the occurrence of degradation are related to technological implementation of the receivers. Thus, for example, the use of filters in the receiver front end to improve the dynamic response of the system may impair the matched filter characteristics required and create group delay variations over the spectrum, causing more degradation and higher thresholds. Local oscillator jitter may require the use of phase locked loops having a bandwidth so large that data are tracked; alternatively, the resulting jitter on the reference signal degrades the data. When a Costas loop is used, usually the data filters in both arms are not matched but are only approximations of the data spectrum. This incrneases subcarrier jitter and makes the acquisition threshold higher.

Another disadvantage results from the fact that methods of subcarrier tracking from a biphase modulated signal exhibit a 180 degree phase ambiguity which results in a sign ambiguity of the baseband signal. Using the definition that the subcarrier has a positive zero crossing at the start of the bit can resolve this ambiguity. However, this can not be achieved with separate subcarrier demodulators and bit conditioners.

Finally, currently available demodulator devices comprise many components which are in analog technology such as operational amplifiers. Such analog components require regular fine tuning due to the occurrence of drift. Fine tuning can only be performed by highly skilled operators using specialized equipment and, in practice, the end result is more degradation and worse thresholds.

This invention pertains to a method for demodulating a carrier wave which is phase modulated by a subcarrier wave which is phase shift key modulated by baseband signals, according to which at least one phase demodulation is performed using a Costas tracking loop to regenerate the modulated wave, wherein the resulting baseband signals are subjected to a sampling and filtering process followed by a decoding process, a method which does not exhibit the aforementioned disadvantages.

In accordance with the method according to this invention, the frequency is first down-converted to an intermediate frequency which is lower than the frequency of the carrier wave, the subcarrier wave is then extracted by phase demodulation wave using a modified Costas loop, part of which is a digital circuit, and in which the subcarrier is regenerated by a waveform synthesizer and which comprises matched digital filters; the signal demodulated in the Costas loop is then digitally sampled at a freuency which is twice the intermediate frequency and the bit clock frequency is then regenerated in a first order phase locked loop, using the subcarrier wave frequency as a reference frequency.

The invention consists in using an intermediate frequency, of inverting the sequence of carrier and subcarrier wave demodulation in the Costas loop and replacing demodulation of the carrier by digital sampling of the demodulated signal in the Costas loop.

The frequency conversion to an intermediate frequency improves demodulator performance because the signal to noise ratio is better at intermediate frequency. This provides a higher signal component for carrier demodulation. The use of matched digital filters in the two arms of the Costas loop improves the subcarrier acquisition threshold since it allows for drift-free filtering and the use of phase locked loop filters with very narrow bandwidths. The interface between the analog and the digital signals is easily implemented, for instance by using integrated circuits of the VLSI type having a very high level of integration.

Use of a first order phase locked loop for bit clock regeneration controlled by the subcarrier wave is based on the fact that the subcarrier frequency and the bit clock frequency are coherent. Because of this, the bandwidth of the loop can be indefinitely reduced, which improves bit clock hold-in periods.

According to another characteristic of the invention, the bit clock frequency is obtained by determining its phase in a first order phase locked loop which multiplies a matched digital signal at the start of each bit with a matched digital signal at midbit, where the subcarrier frequency is divided by the resulting signal to produce the bit clock frequency.

Determination of the bit clock frequency phase provides information on the occurrence of bit slip, obviating the need to resort to the search process known as "node-switching."

According to yet another characteristic of the invention, the level of the Costas loop input signal is regulated according to the level of the digital output signal.

This regulation allows for adjustment of the input level of the Costas loop so as to compensate for the modulation factor.

According to yet another characteristic of the invention, the form of the reference waves generated by the waveform synthesizer is matched to the input signal waveform after it has been modified by the characteristics of the circuit which performs demodulation. In this way, the two waveforms processed by the demodulator circuits are matched to the maximum, which further improves the data signal to noise ratio.

The object of the invention is also to provide an apparatus for implementing the aforementioned method. In this apparatus, each external arm ("data" and "error" arms) of the Costas loop, sequentially from the modulated signal input, comprises a balanced demodulator mixer circuit which receives a waveform at the subcarrier wave frequency, a bandpass filter, a sampling multiplier which receives a signal at twice the frequency of the intermediate frequency, an analog to digital converter and a matched digital filter controlled by the bit clock frequency, the output of which is passed onto a multiplier which multiplies the "data" and "error" signals.

According to another characteristic of the apparatus according to the invention, the central branch of the Costas loop comprises, sequentially from the "data" and "error" multiplier, a second order loop filter, a variable frequency oscillator and a waveform synthesizer driven by the bit clock frequency and connected to the two demodulator mixer circuits by an analog to digital converter. The use of a digital waveform synthesizer more particularly allows production of all of the desired waveforms.

The apparatus according to the invention may also be employed for demodulation of signals modulated by binary phase shift keying (BPSK). To perform this demodulation process, subcarrier demodulation is omitted and the signal is digitally sampled at a frequency of four times the intermediate frequency.

Other characteristics and advantages of the invention will become apparent from the description below which is provided as an illustration of the invention and which refers to the drawings, wherein:

The signal which is received from the spacecraft is first down-converted to an intermediate frequency which is lower than the initial carrier frequency. The signal received at 15 (FIG. 3) is passed onto a frequency conversion device of a known type (16) which converts the frequency to the intermediate frequency ($f_c$). This frequency conversion device comprises an automatic gain control to produce a level- and frequency-calibrated signal.

In accordance with the invention, the resulting intermediate frequency signal is phase-demodulated in a demodulator device comprising an inverted Costas loop, that is, the order of demodulation of the carrier and subcarrier waves is inverted. The subcarrier is first demodulated using the signal generated by a subcarrier waveform synthesizer The signals produced after this demodulation process are filtered, then sampled at a frequency which is twice the frequency of the intermediate frequency ($f_c$), resulting in carrier demodulation. In each external "data" and "error" arm of the Costas loop, the resulting baseband signals are digitized then filtered in a matched filter controlled by the bit clock frequency ($f_B$). The "data" and "error" signals are multiplied in digital form at the baseband bit signal level.

After filtering, the signal which corresponds to the product of the "data" and "error" signals controls the waveform synthesizer which supplies the reference signals at subcarrier frequency for the elements performing subcarrier demodulation.

Figure 1:
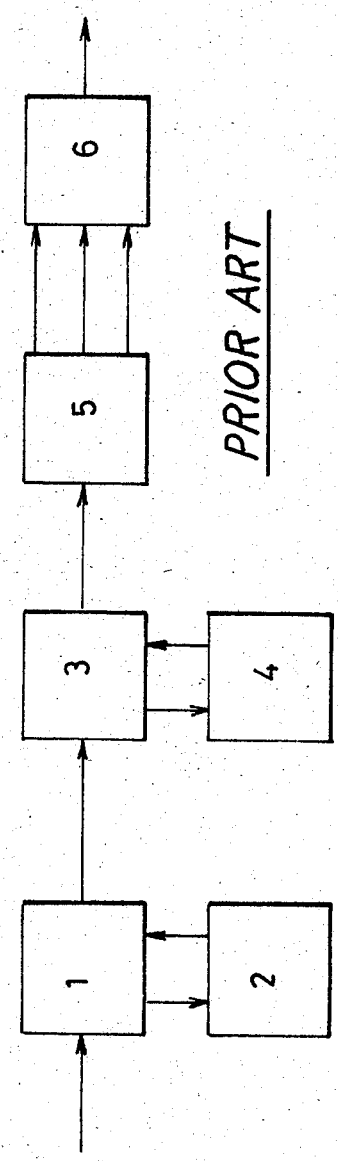
FIGS. 1 and 2 are block diagrams illustrating the prior art.
Figure 2:
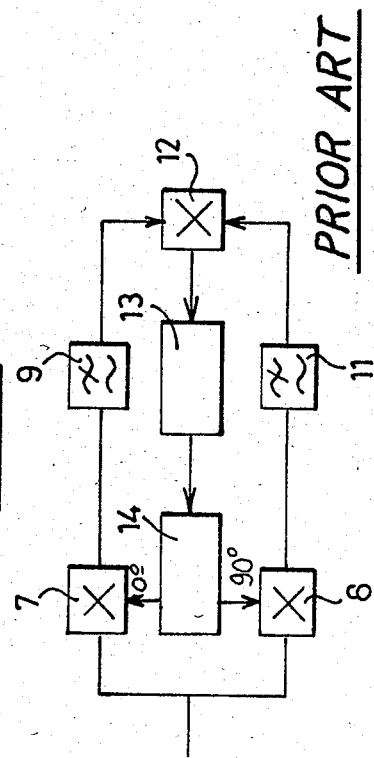
Figure 3:
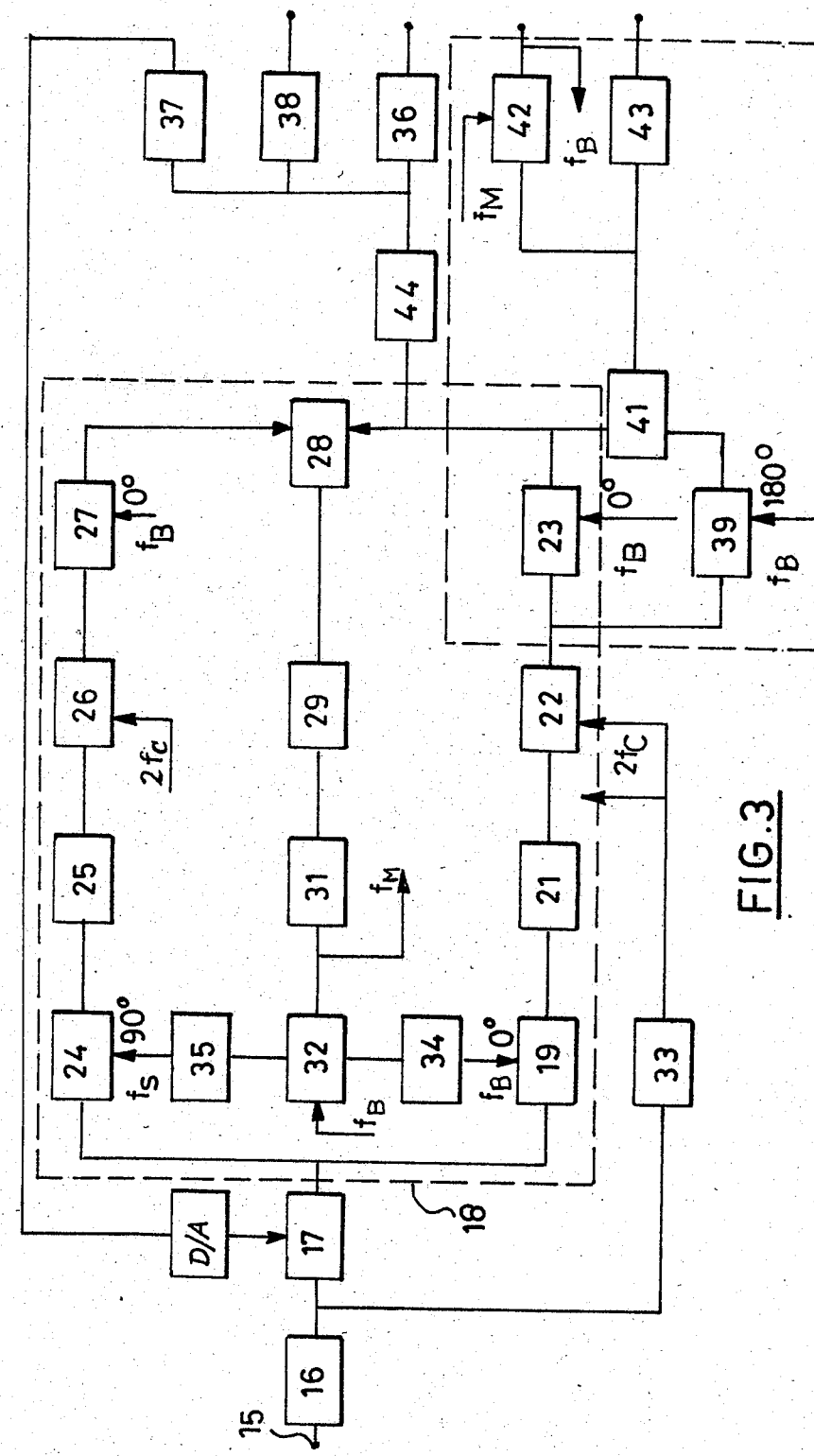
FIG. 3 is a block diagram illustrating the principle of the invention.

This method is illustrated in FIG. 3, wherein the intermediate frequency signal generated by circuit 16 is passed through an attenuator (17) to a demodulator assembly (18) which, in a sense, is a Costas loop containing additional elements. The external "data" arm comprises a mixer (19) which receives a waveform at subcarrier frequency and demodulates the subcarrier, a bandpass filter (21) which passes the component with frequency $f_c$, a circuit (22) where sampling is performed using a reference signal at twice the intermediate frequency ($f_c$); the resulting signals are digitized and the samples are added and subtracted in an integrator register and a matched digital filter (23) which receives a reference signal at the bit clock frequency ($f_B$). In a similar manner, the "error" arm of the Costas loop comprises a mixer (24) which receives a signal which is 90 degrees out of phase with respect to the signal received by mixer 19, a bandpass filter (25), a demodulator and a digitizer (26) and a matched digital filter (27) which also receives a reference signal at bit clock frequency. The two digital baseband signals generated by the two arms of the Costas loop are multiplied in the multiplier (28), the output signal of which is filtered in a second order loop filter (29), the output of which controls a variable frequency oscillator (31), the output frequency ($f_M$) of which corresponds to the subcarrier frequency. The output signal of the variable frequency oscillator (31) is passed to a waveform synthesizer (32) which is driven by the bit clock frequency ($f_B$). A second order phase locked loop (33) receives the intermediate frequency signal and supplies the sampling signals to the demodulator and digitizer circuits (22 and 26).

The waveform synthesizer comprises two digital memories in which samples of one period of the desired waveform are stored; at every bit clock pulse, the next values of the waveform are produced through the digital to analog converters (34 and 35). In accordance with the invention, the waveform generated by the synthesizer is such that it matches the input signal subcarrier waveform, when distorted by the load characteristics of the demodulator mixer circuit (19 and 24, respectively). In the waveform synthesizer (32), a positive zero crossing corresponds to a certain memory address; the address value which is present at the start of the bit clock can be noted and averaged in order to resolve the phase ambiguity problem for single phase modulation (BPSK). The digital baseband "data" signals obtained at the output of the matched digital filter (23) are processed in the following manner: They are sampled at the end of each bit and passed onto a "soft decision" recoding circuit which generates the bit stream. In addition, the absolute value of the filter (23) output signal can be averaged over several bits. This average value is proportional to the level of the attenuator (17) output signal; it can be filtered through a digital circuit forming a replica of an RC filter. The resulting signal produced by a circuit (37) is used to control the variable attenuator (17) in such a way as to stabilize the Costas loop input signal level.

In a third circuit (38), the filter (23) output signal is squared and added to a sum of squares. At regular intervals, this circuit (38) computes the following value:

$$M_2 = <B^2> - </B/>^2$$

from which the probability of bit errors follows if a Gaussian noise distribution is assumed. Information relating to the link margin is thus produced at the output of circuit 38.

According to the invention, the bit clock frequency is regenerated to the degree required to resolve the phase ambiguity in single phase modulation (BPSK) systems, and for driving of the matched digital filters (23 and 27). The bit clock frequency is regenerated using the frequency ($f_M$) supplied by the oscillator (31) as a reference frequency; the bit clock frequency ($f_B$) is obtained by dividing the oscillator (31) frequency by a known integer. The resulting bit clock is used for driving the waveform synthesizer (32) and the matched filters (23 and 27).

Because the subcarrier frequency ($f_c$) and the clock frequency ($f_B$) are coherent, the bit clock regenerator circuit needs only to adjust the phase of this bit clock. The bit clock phase is determined in a first order phase locked loop in which a matched digital signal at the end of each bit is multiplied by a matched digital signal at midbit. For this purpose, said loop comprises two matched filters which receive two waves which are 180 degrees out of phase with each other.

Advantageously, according to the invention, said clock frequency phase regenerator loop uses one of the arms of the Costas loop described above, that is, the matched filter (23) of the external "data" arm of the Costas loop. This clock circuit phase regeneration loop comprises another similar filter (39) which receives a wave at bit clock frequency which is 180 degrees out of phase with respect to the frequency applied to filter 23.

The bit clock (41) frequency phase detector thus receives two filtered signals, one of which is sampled at the end of each bit and the other at midbit. These two signals are multiplied at each new sample, that is, they are multiplied twice per clock period. The product obtained at the end of each bit is added to a running sum and the product at midbit is subtracted from this running sum.

When the sampling instants are advanced or retarded with respect to the bit transitions, this sum will increase or decrease. When a high or low threshold is reached, the clock frequency is shifted by one step, for instance one period of the signal frequency produced by the oscillator (31) and the sum register is reset to zero.

The phase locked loop created in this manner is of the first order. After acquisition, its response can be slowed down indefinitely by increasing the thresholds since the bit clock frequency will always be tracked by the subcarrier slave frequency, the master frequency being the frequency produced by the oscillator (31). Consequently, a first order phase locked loop cannot become unstable in the absence of the signal.

The bit clock is regenerated in a circuit (42) which contains the register as described above and a divider circuit which receives the master frequency delivered by the oscillator (31) and which supplies the bit clock which is sent to the synthesizer (32) on the one hand and to the three matched filters (23, 27 and 39) on the other hand.

An output signal of the bit clock phase detector circuit (41) is also used to supply information on the stability of the bit clock. For this purpose, a circuit (43) integrates the output signal of circuit 41 to indicate the occurrence of bitslips.

Two algorithms may be applied for the matched filters (23, 27 and 29), depending on the required application of the demodulator. The first algorithm simulates a continuous output by producing for each sample $i = S_i$ the value $$H_i = \sum_{j=i-N}^{i} S_j$$

where N equals the number of samples per bit. This signal is produced with limited processing power by adding sample i and subtracting sample i−N from a running result:

$$H_i = H_{i-1} + S_i - S_{i-N}$$

The filter is then matched to a square wave pulse code modulation (PCM) format and yields a best bit estimate when sampled at the end of a bit period.

The second algorithm simulates the integrate and dump integrator filter by producing for each bit:

$$H = \sum_{j=1}^{N} S_j$$

The first algorithm makes the subcarrier Costas loop independent of bit clock signal acquisition; however, the loop parameters will be somewhat dependent on transition density (natural frequency and damping factor are multiplied by $\sqrt{3}$ when the transition density goes from 0 to 100%).

The second algorithm makes the Costas loop lock dependent on bit clock lock which may, under certain conditions, delay acquisition. However, when locked, the Costas loop is independent of transition density. Thus, a small change to this algorithm allows weighting of the different samples $$H = \sum_{j=1}^{N} W_j S_j$$

in order to match the filter to a non-square pulse code modulation (PCM) format, that is, when using minimum shift keying modulation systems. Such weighting is, in principle, also possible for a quasi-continuous filter but will greatly increase the processing required.

If the PCM data are coded using split phase coding, the matched filters are only matched to a value equal to half the bit period. A match to the split phase format is obtained by setting a double bit rate in the matched filter and in bit clock acquisition. The half bits thus obtained are then combined in pairs in a split phase decoder (44) which receives the signals supplied by the Costas loop and non return to zero (NRZ-L) output is produced using the algorithm appropriate to the specific split phase code used (L, M or S), also resolving the phase ambiguity from the statistics of the results.

For the specific case of split phase level (SP-L) coding, processing may also be performed by multiplying the digitized signal at the output of circuits 22 and 26 with the square wave bit clock signal.

In both cases, the acquisition threshold of the Costas loop will be 3 dB higher than for the NRZ code.

Figure 4:
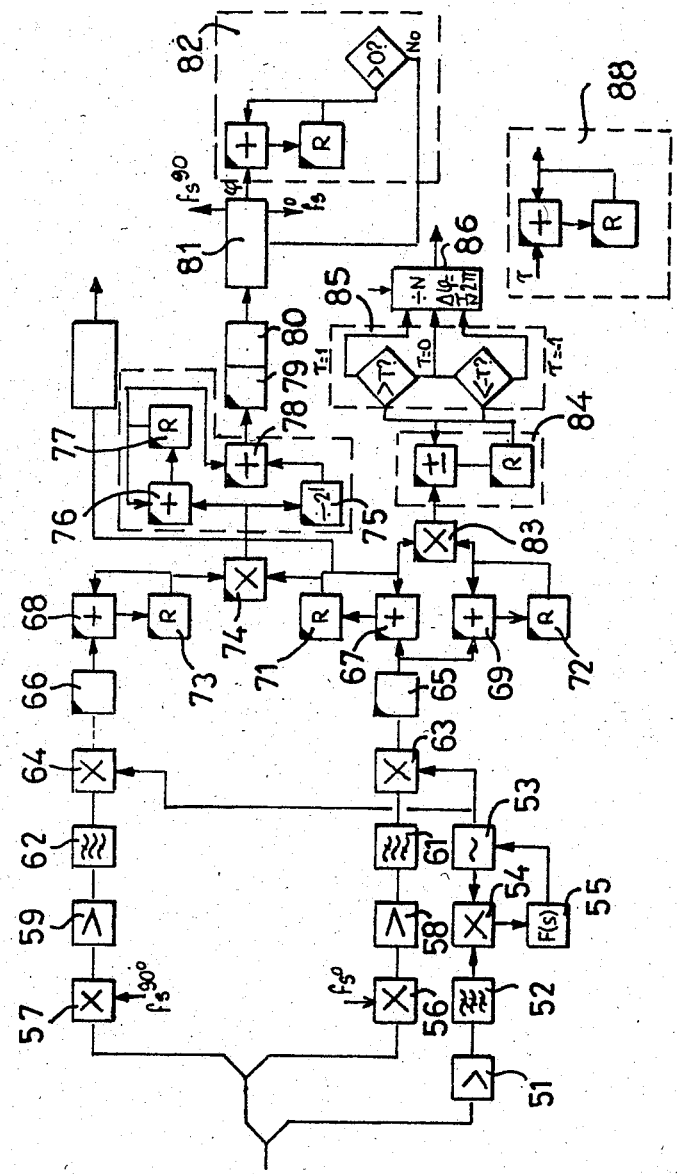
FIG. 4 represents an embodiment of the invention.

FIG. 4 is a block diagram showing an embodiment of the invention which has been used as a prototype. The figure provides details on one possible practical embodiment of the invention in modular form. Certain elements of the diagram in FIG. 3 were not embodied in this prototype.

The phase locked loop for tracking the carrier wave (33) of the diagram of FIG. 3 consists of an amplifier (51) a narrow band filter (52) and a direct second order phase locked loop comprising a voltage controlled crystal oscillator (53), a multiplier (54) and a loop filter (55).

Each external arm of the Costas loop successively comprises a subcarrier multiplier (56 and 57, respectively) being a balanced mixer, an amplifire (58 and 59, respectively), a bandpass filter (61 and 62, respectively), a carrier multiplier (63 and 64, respectively) and a digitization module being an analog to digital converter (65 and 66, respectively). The matched filters each comprise an adder (67, 68 and 69, respectively) associated with a register (71, 72 and 73, respectively) so as to form a sum-into-register module to perform the integrate and dump functions. The signals supplied by the two arms of the Costas loop are delivered to a multiplier module consisting of a VLSI integrated circuit with a very high level of integration (74).

The signal delivered by the multiplier (74) is received by a second order loop filter comprising an integrator and an accelerated adder and consisting of a divider by $2^1$ (75) on the one hand, and an adder (76) associated with a register (77) on the other hand; the resulting signals are sent to an adder (78). The output signal of this adder is passed through a digital-to-analog converter (79), to a voltage controlled crystal oscillator (80), the output signal of which is passed to the waveform synthesizer (81) which contains a digital phase polarity comparator (82) which feeds back a phase inversion command to the synthesizer (81) if the bit clock signal is found at a negative zero crossing.

The bit clock chain comprises the matched filter consisting of elements 69 and 72, a multiplier (83), a clock phase comparator and integrator assembly (84), a threshold detection assembly (85) and a divider (86) corresponding to the divider (42) shown in FIG. 3 and yielding the clock signal. The bitslip detection circuit (87) is shown separately.

The modulator prototype shown in FIG. 4 was tested together with a typical phase lock receiver. The results may be summarized as follows:

Degradation is less than 0.5 dB for a ratio of energy per bit to noise ranging from −2 dB to 10 dB.

The acquisition threshold is lower than 16 dB in the Costas loop, which corresponds to a ratio of energy per bit to noise of less than −4 dB.

The above description is provided as a non-limiting example; it is apparent that modifications or variations can be made thereto without exceeding the scope of this invention.

Thus, all digital processing may be executed by one or more bit slice processors depending on the processing speed required. Referring to FIG. 3, certain functions would then remain implemented in intermediate frequency technology: the phase locked loop (33), the attenuator (16), the multipliers (19 and 24), the analog filters (21 and 25) and possibly the variable frequency oscillator (31). The carrier demodulator samplers (22 and 26) would then form a special sub-assembly.

All the remaining digital functions may be executed in a simple microcomputer configuration with analog-digital interfacing if the data rate allows this.

For very high data rates, a processor may ultimately be provided for each function, with function modules using VLSI technology with a very high level of integration where the data stream may find a bottleneck, for instance in the multipliers.

We claim:

1. A method for demodulating a carrier wave which is phase modulated by a subcarrier wave which is phase shift modulated by baseband signals, according to which at least one phase demodulation process is performed using a Costas tracking loop to regenerate the carrier wave, wherein the baseband signals obtained are all subsequently sampled, then decoded, characterized by the fact that a carrier wave frequency is first converted to an intermediate frequency which is lower than the carrier wave frequency, that the subcarrier wave is extracted by a phase demodulation process using a modified Costas loop having a digital circuit portion comprising a waveform synthesizer by which the subcarrier is regenerated and matched digital filters, that digital sampling is then performed on the signal demodulated in said modified Costas loop at a frequency which is twice the frequency of the intermediate frequency and that a bit clock frequency is regenerated in a first order phase locked loop wherein the subcarrier wave frequency is used as a reference frequency in regeneration of said bit clock frequency.

2. A method as claimed in claim 1, characterized by the fact that the bit clock frequency is obtained by phase determination in a first order phase locked loop in which a matched digital signal is multiplied at the end of each bit by a matched signal at midbit, wherein the subcarrier frequency is divided by the resulting signal to produce the bit clock frequency.

3. A method as claiemd in either claim 1 or claim 2, characterized by the fact that the level of an input signal of the modified Costas loop is regulated as a function of an output digital signal.

4. A method as claimed in claim 2, characterized by the fact that a signal matched in phase to a signal of said bit clock frequency is integrated in such a way as to produce a signal which indicates occurrence of bitslip.

5. A method as claimed in any of claims 1, 2, and 4 characterized by the fact that a waveform at the carrier wave frequency supplied by the waveform synthesizer is matched to an input signal waveform at said intermediate frequency as modified by characteristics of a demodulator mixer circuit.

6. A method as claimed in any of claims 1, 2, and 4 characterized by the fact that a digital baseband output signal sampled at an end of each of a clock pulse bit is squared and added to a sum of squares, in such a way as to compute a probability of bit errors.

7. A method as claimed in any of claims 1, 2, and 4 characterized by the fact that subcarrier demodulation is omitted and by the fact that carrier demodulation is achieved by sampling the signal at a frequency which is equal to four times the intermediate frequency, so as to demodulate signals modulated by binary phase shift keying.

8. An apparatus for implementing a process for demodulating a carrier wave which is phase modulated by a subcarrier wave which is phase shift modulated by baseband signals, by which at least one phase demodulation process is performed using a Costas tracking loop to regenerate the carrier wave, wherein the baseband signals obtained are all subsequently sampled, then decoded, wherein a carrier wave frequency is first converted to an intermediate frequency which is lower than the carrier wave frequency, and the subcarrier wave is extracted by a phase demodulation process using a modified Costas loop, characterized by the fact that each "data" arm and "error" arm of the modified Costas loop comprises, in sequence, a demodulator mixer circuit which receives a waveform at subcarrier wave frequency, a bandpass filter, a sampling multiplier which receives a signal at a frequency which is twice the intermediate frequency, an analog to digital converter and a matched digital filter controlled by the bit clock frequency and the output of which is received by a multiplier of "data" and "error" arm signals.

9. An apparatus as claimed in claim 8, characterized by the fact that the central branch of the modified Costas loop comprises, sequentially and starting from a multiplier of "data" and "error" arm signals, a second order loop filter, a variable frequency oscillator, and a waveform synthesizer which is driven by the bit clock frequency and connected to the two demodulator mixer circuits by a digital to analog converter.

10. An apparatus as claimed in claim 9, characterized by the fact that the waveform synthesizer comprises two digital memories in each of which one waveform cycle is stored.

11. An apparatus as claimed in any of claims 8 through 10, and further comprising a second order phase locked loop which receives the input signal at intermediate frequency and supplies a signal the frequency of which is a multiple of the intermediate frequency.

12. An apparatus as claimed in any of claims 8 through 10, and further comprising a variable attenuator positioned at the input of the modified Costas loop and controlled by a digital circuit similar to an RC analog filter and supplying an average value of output bit signals.

13. An apparatus as claimed in any of claims 8 through 10, characterized by the fact that the first order phase locked loop which regenerates the bit clock frequency comprises two arms, each of which comprises a matched digital filter controlled by the bit clock frequency, wherein one of said filters is the filter of the "data" arm of the modified Costas loop and the other of said filters is controlled by a wave in opposed phase with respect to a wave controlling the "data" arm filter of the modified Costas loop.

14. An apparatus as claimed in claim 13, characterized by the fact that the matched digital filters of the modified Costas loop and of the clock frequency regeneration loop consist of sum-into-register modules.

15. An apparatus for implementing a process for demodulating a carrier wave which is phase modulated by a subcarrier wave which is phase shift modulated by baseband signals, by which at least one phase demodulation process is performed using a Costas tracking loop to regenerate the carrier wave, wherein the baseband signals obtained are all subsequently sampled, then decoded, wherein a carrier wave frequency is first converted to an intermediate frequency which is lower than the carrier wave frequency, and the subcarrier wave is extracted by a phase demodulation process using a modified Costas loop, and comprising at least one processor of a bit slice type which executes at least some digital functions of the process, wherein functional analog processes are executed in technology known as integrated function technology.

16. An apparatus as claimed in claim 15, wherein the processor comprises a microprocessor, and high speed digital functions are executed separately in integrated circuit technology with a very high degree of integration.

* * * * *